(12) United States Patent
Richter (10) Patent No.: US 9,484,693 B1
(45) Date of Patent: Nov. 1, 2016

(54) CORD ORGANIZING ASSEMBLY

(71) Applicant: Tyler James Richter, Youngstown, OH (US)

(72) Inventor: Tyler James Richter, Youngstown, OH (US)

(*) Notice: Subject to any disclaimer, the term of this patent is extended or adjusted under 35 U.S.C. 154(b) by 0 days.

(21) Appl. No.: 14/736,454

(22) Filed: Jun. 11, 2015

(51) Int. Cl.
*H01R 27/02* (2006.01)
*H01R 13/73* (2006.01)
*H01R 13/72* (2006.01)
*H01R 13/66* (2006.01)

(52) U.S. Cl.
CPC .......... *H01R 27/02* (2013.01); *H01R 13/6675* (2013.01); *H01R 13/72* (2013.01); *H01R 13/73* (2013.01)

(58) Field of Classification Search
CPC .............................. H01R 13/72; H01R 25/006
USPC ........................................................ 439/501
See application file for complete search history.

(56) References Cited

U.S. PATENT DOCUMENTS

| | | | |
|---|---|---|---|
| 3,290,453 A * | 12/1966 | Jensen | B65H 75/4476 174/135 |
| 3,473,278 A | 10/1969 | Gossen | |
| 4,095,871 A * | 6/1978 | Holte | H02G 11/02 191/12.4 |
| 4,123,012 A * | 10/1978 | Hough | B65H 75/06 242/405.2 |
| 4,177,961 A * | 12/1979 | Gruenewald | B65H 75/36 242/405.2 |
| 4,258,515 A | 3/1981 | Owen | |
| 4,353,613 A * | 10/1982 | Carlow | B65H 75/06 439/501 |
| 4,484,692 A | 11/1984 | Palermo | |
| 4,563,542 A | 1/1986 | Pollack | |
| 4,656,320 A * | 4/1987 | Maddock | H02G 11/02 191/12.4 |
| 4,725,697 A * | 2/1988 | Kovacik et al. | H02G 11/02 191/12.4 |
| D295,521 S | 5/1988 | Mockett | |
| 4,778,125 A * | 10/1988 | Hu | H02G 11/02 191/12.2 R |
| 4,867,701 A * | 9/1989 | Wiand | H01R 25/006 248/205.3 |
| 4,875,878 A * | 10/1989 | Meyer | B65H 75/362 439/501 |
| 4,984,685 A * | 1/1991 | Douglas | B65H 75/362 206/388 |
| 5,057,039 A * | 10/1991 | Persing et al. | A47B 21/06 248/231.71 |
| 5,071,367 A * | 12/1991 | Luu | H01R 13/72 191/12.4 |
| D331,917 S | 12/1992 | DuBrucq | |
| 5,582,524 A * | 12/1996 | Sanner et al. | H01R 13/6392 29/869 |
| 5,595,494 A * | 1/1997 | Wiebe | H01R 25/00 174/494 |
| 5,657,841 A * | 8/1997 | Morvan | H02G 11/02 191/12.4 |
| 5,700,150 A * | 12/1997 | Morin | H01R 13/72 191/12.4 |
| 5,700,158 A * | 12/1997 | Neiser et al. | H01R 13/641 439/373 |
| 5,701,981 A * | 12/1997 | Marshall et al. | H02G 11/02 191/12.4 |
| 5,723,815 A * | 3/1998 | Pena | H02G 11/02 174/135 |
| 5,732,747 A | 3/1998 | Holliday | |
| 5,733,141 A * | 3/1998 | Penrod | H02G 11/02 191/12.2 R |
| 5,738,548 A * | 4/1998 | Rutulante | H01R 13/72 439/4 |
| 5,773,757 A * | 6/1998 | Kenney et al. | H01R 13/72 174/53 |
| 5,780,775 A * | 7/1998 | Yu | H01R 13/506 174/135 |
| 5,819,894 A * | 10/1998 | Okamoto | B65H 75/04 191/12.4 |
| 5,848,701 A * | 12/1998 | Riccabona | B25H 3/00 206/373 |
| 5,899,761 A * | 5/1999 | Crane et al. | H01R 25/00 439/142 |
| 5,906,517 A * | 5/1999 | Crane et al. | H01R 25/00 |

| | | | |
|---|---|---|---|
| 5,917,694 A * | 6/1999 | Denny | 439/654 A45D 1/00 206/372 |
| 5,931,702 A * | 8/1999 | Fladung | H01R 13/6392 439/369 |

(Continued)

*Primary Examiner* — Ross Gushi (57) ABSTRACT

A cord organizing assembly includes a housing that may be coupled to a support surface. The housing has a well therein such that the well may have a plurality of cords positioned within the well. A pair of retainers is provided and each of the retainers is coupled the housing. Each of the retainers is positioned within the well such that each of the retainers may retain the cords within the well. A power supply is coupled to the housing such that the power supply may have each of the cords is electrically coupled to the power supply thereby facilitating the power supply to provide electrical power to each of the cords.

9 Claims, 4 Drawing Sheets

(56) References Cited

U.S. PATENT DOCUMENTS

| | | | | |
|---|---|---|---|---|
| 6,004,157 A * | 12/1999 | Glass | A47B 21/06 | 439/535 |
| 6,017,228 A * | 1/2000 | Verbeek et al. | A47B 21/06 | 174/493 |
| 6,028,267 A | 2/2000 | Byrne | H01R 13/518 | 174/55 |
| 6,077,109 A * | 6/2000 | Prazoff | H01R 25/003 | 191/12.4 |
| 6,179,665 B1 * | 1/2001 | Rossman et al. | H01R 13/72 | 439/131 |
| 6,183,280 B1 * | 2/2001 | Laukhuf | A47B 21/06 | 439/214 |
| 6,229,691 B1 * | 5/2001 | Tanzer et al. | H01R 25/006 | 361/610 |
| 6,234,812 B1 * | 5/2001 | Ivers et al. | A47B 21/06 | 362/127 |
| 6,243,257 B1 * | 6/2001 | Ester | H01R 13/72 | 200/51 R |
| 6,270,370 B1 * | 8/2001 | Chien | H01R 13/60 | 439/371 |
| 6,315,604 B1 * | 11/2001 | Lee | H01R 13/516 | 439/535 |
| 6,379,182 B1 * | 4/2002 | Byrne | H01R 13/74 | 439/574 |
| 6,410,994 B1 * | 6/2002 | Jones et al. | H01R 13/514 | 307/11 |
| 6,503,097 B2 * | 1/2003 | Archambault | H01R 13/60 | 439/4 |
| 6,540,554 B2 * | 4/2003 | McCarthy | H01R 27/02 | 439/574 |
| 6,573,617 B2 * | 6/2003 | Jones et al. | H01R 13/514 | 307/11 |
| 6,589,073 B2 * | 7/2003 | Lee | H01R 13/516 | 439/535 |
| 6,642,450 B1 * | 11/2003 | Hsiao | H01R 25/006 | 174/480 |
| 6,717,053 B2 * | 4/2004 | Rupert | H02G 3/14 | 174/53 |
| 6,746,272 B2 * | 6/2004 | Bean | B65H 75/4473 | 439/501 |
| 6,748,707 B1 * | 6/2004 | Buchalter | E04F 15/024 | 439/131 |
| 6,793,523 B1 * | 9/2004 | Wei | H01R 13/72 | 439/501 |
| 6,811,281 B1 * | 11/2004 | Hsiao | F21S 8/035 | 362/401 |
| 6,848,937 B1 * | 2/2005 | Hsiao | H02G 11/02 | 439/501 |
| 6,885,796 B2 * | 4/2005 | Lubkert | G06F 1/266 | 312/223.3 |
| 6,897,379 B1 * | 5/2005 | Hsiao | H01H 9/0214 | 174/480 |
| 7,001,211 B2 * | 2/2006 | Lichtscheidl | H01R 25/003 | 439/131 |
| 7,004,786 B1 * | 2/2006 | Bloom | H01R 13/72 | 439/142 |
| 7,081,006 B2 * | 7/2006 | Lichtscheidl | H01R 25/003 | 439/131 |
| 7,083,421 B1 * | 8/2006 | Mori | H01R 25/006 | 439/574 |
| 7,114,603 B2 * | 10/2006 | Lai | B65H 75/40 | 191/12.2 R |
| 7,172,456 B1 * | 2/2007 | Nagy | H01R 13/72 | 174/135 |
| 7,175,473 B1 * | 2/2007 | Clapp | H01R 13/72 | 191/12.2 R |
| 7,223,122 B2 * | 5/2007 | Mori | H01R 13/447 | 439/501 |
| 7,341,463 B2 * | 3/2008 | Lai | H01R 13/512 | 174/484 |
| 7,358,625 B2 * | 4/2008 | Cheng | H01R 13/6675 | 307/18 |
| 7,467,971 B2 * | 12/2008 | Lin | H01R 13/60 | 191/12.2 R |
| 7,717,738 B2 * | 5/2010 | Mabry | H01R 25/003 | 439/501 |
| 7,736,178 B2 * | 6/2010 | Byrne | G06F 1/266 | 439/527 |
| 7,758,376 B2 * | 7/2010 | Hwang | H01R 13/60 | 191/12.4 |
| 7,815,025 B2 * | 10/2010 | Chen | B65H 75/4431 | 191/12 R |
| 7,845,974 B2 * | 12/2010 | Yue | H01R 13/72 | 191/12.4 |
| 7,862,385 B2 * | 1/2011 | Lee | H01R 13/70 | 439/652 |
| 7,888,608 B2 * | 2/2011 | Hybiske | A47B 21/06 | 174/135 |
| 7,938,679 B2 * | 5/2011 | Wadsworth | H01R 13/74 | 439/574 |
| 7,988,494 B2 * | 8/2011 | Lee | H01R 13/713 | 439/652 |
| 8,007,295 B2 * | 8/2011 | Lin | A47B 21/06 | 439/131 |
| 8,148,638 B2 | 4/2012 | Morita | | |
| 8,235,323 B2 * | 8/2012 | Newton, Jr. | B65H 75/14 | 242/118.6 |
| 8,292,656 B2 * | 10/2012 | Mydlarz | H01R 13/60 | 439/501 |
| 8,420,942 B2 | 4/2013 | Short | | |
| 8,480,429 B2 * | 7/2013 | Byrne | H02G 3/128 | 439/574 |
| 8,517,760 B2 * | 8/2013 | Steele | B60S 5/046 | 141/38 |
| 8,517,761 B2 * | 8/2013 | Frenkil | H01R 13/72 | 439/501 |
| 8,771,005 B2 * | 7/2014 | Tracey | H01R 13/516 | 439/445 |
| 8,801,458 B2 * | 8/2014 | Ceraldi | H01R 13/72 | 439/501 |
| 8,920,191 B2 * | 12/2014 | Carpanzano | H01R 13/74 | 439/491 |
| 8,932,076 B2 * | 1/2015 | Steele | B60S 5/046 | 141/38 |
| 9,054,449 B2 * | 6/2015 | Utz | H01R 13/5812 | |
| 9,148,006 B2 * | 9/2015 | Byrne | H02G 3/18 | |
| 9,148,030 B1 * | 9/2015 | Johnson | H02J 7/0042 | |
| 9,219,341 B1 * | 12/2015 | O'Keefe | H01R 25/006 | |
| 9,225,128 B2 * | 12/2015 | Yap | H01R 25/003 | |
| 9,257,803 B2 * | 2/2016 | Alagna | H01R 25/006 | |
| 2002/0106933 A1 * | 8/2002 | Lee | H01R 13/72 | 439/501 |
| 2004/0121225 A1 * | 6/2004 | Krieger et al. | H01M 2/1005 | 429/96 |
| 2004/0203277 A1 * | 10/2004 | Chien | H01R 13/72 | 439/501 |
| 2005/0106933 A1 * | 5/2005 | Yap | H01R 13/60 | 439/501 |
| 2005/0106935 A1 * | 5/2005 | Pena | H02G 11/02 | 439/501 |
| 2006/0141855 A1 * | 6/2006 | Bloom | H01R 13/447 | 439/501 |
| 2007/0270025 A1 * | 11/2007 | Mabry | H01R 13/72 | 439/470 |
| 2007/0275594 A1 * | 11/2007 | Greenberg | H01R 13/72 | 439/501 |
| 2008/0116157 A1 * | 5/2008 | Fulbrook | A61M 5/1415 | 211/60.1 |
| 2008/0277133 A1 * | 11/2008 | Axland | H01R 13/60 | 174/54 |
| 2009/0047826 A1 * | 2/2009 | Velco | H01R 13/652 | 439/501 |
| 2010/0261376 A1 * | 10/2010 | Hwang | H01R 13/60 | 439/501 |
| 2011/0065313 A1 * | 3/2011 | Huang | B65H 75/143 | 439/501 |
| 2011/0084651 A1 * | 4/2011 | Caskey | H01R 25/006 | 320/107 |
| 2011/0215759 A1 * | 9/2011 | Lee | G06F 1/266 | 320/115 |
| 2013/0023148 A1 * | 1/2013 | Yap | H01R 25/003 | 439/501 |
| 2013/0102186 A1 * | 4/2013 | Fu | H01R 13/72 | 439/501 |

(56) References Cited

U.S. PATENT DOCUMENTS

| | | | |
|---|---|---|---|
| 2013/0175415 A1* | 7/2013 | Mathieu | A45D 44/02 248/176.2 |
| 2013/0181657 A1* | 7/2013 | Eidsvig | H01R 13/60 320/106 |
| 2013/0244475 A1* | 9/2013 | Sayadi | H01R 13/72 439/501 |
| 2013/0333940 A1* | 12/2013 | Stencil | H02G 3/18 174/503 |
| 2014/0030910 A1* | 1/2014 | Carpanzano | H01R 13/74 439/501 |
| 2014/0120765 A1* | 5/2014 | Lombardo | H01R 9/2408 439/501 |
| 2015/0072552 A1* | 3/2015 | Kim | H01R 25/003 439/501 |
| 2015/0318648 A1* | 11/2015 | Alagna | H01R 25/006 439/501 |
| 2016/0006189 A1* | 1/2016 | Morehead | H01R 13/518 439/501 |

* cited by examiner

CORD ORGANIZING ASSEMBLY

BACKGROUND OF THE DISCLOSURE

Field of the Disclosure

The disclosure relates to organizing devices and more particularly pertains to a new organizing device for organizing a plurality of cords.

SUMMARY OF THE DISCLOSURE

An embodiment of the disclosure meets the needs presented above by generally comprising a housing that may be coupled to a support surface. The housing has a well therein such that the well may have a plurality of cords positioned within the well. A pair of retainers is provided and each of the retainers is coupled the housing. Each of the retainers is positioned within the well such that each of the retainers may retain the cords within the well. A power supply is coupled to the housing such that the power supply may have each of the cords is electrically coupled to the power supply thereby facilitating the power supply to provide electrical power to each of the cords.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
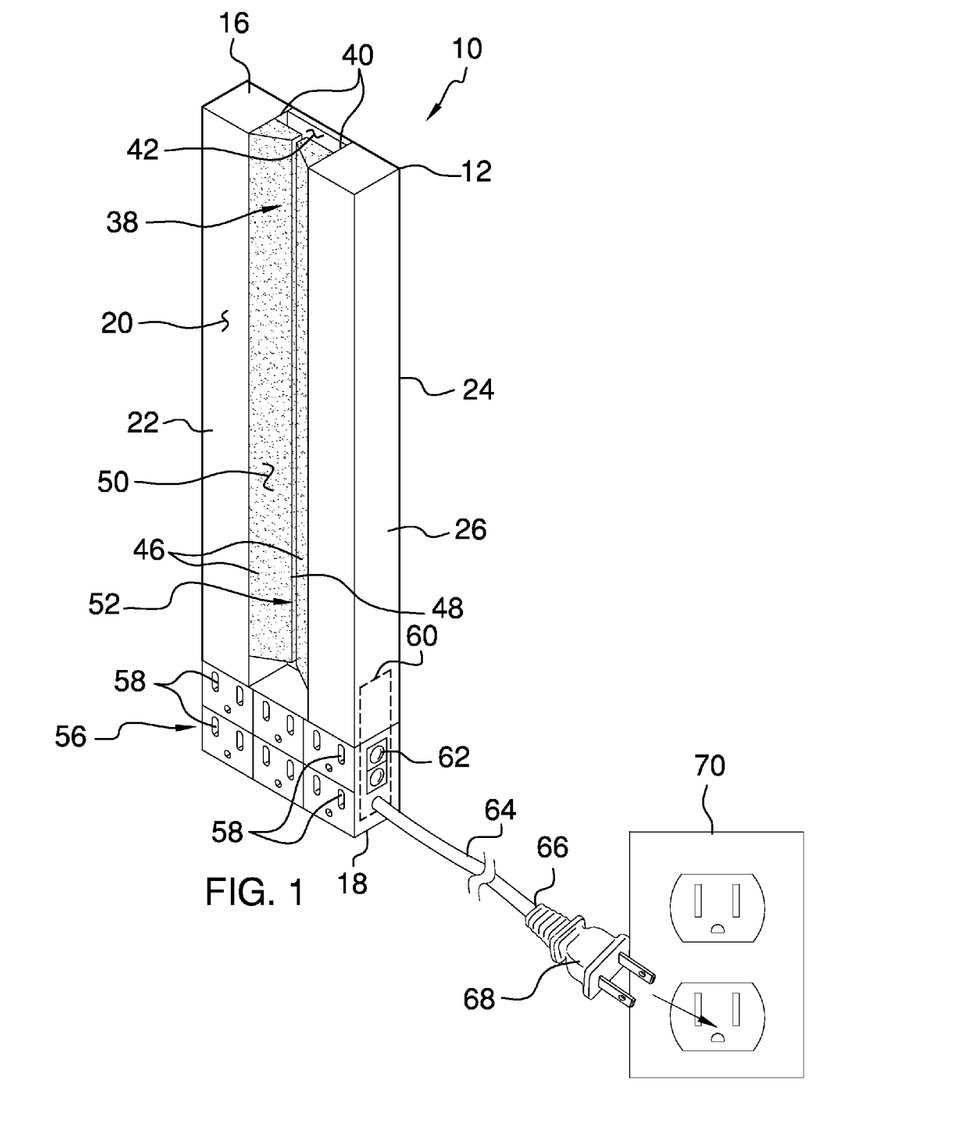
FIG. 1 is a perspective view of a cord organizing assembly according to an embodiment of the disclosure.
Figure 2:
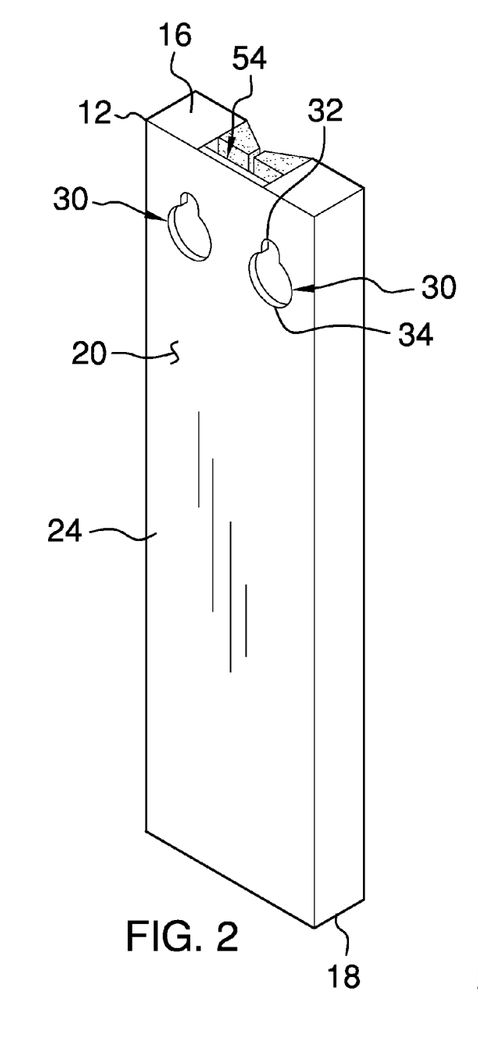
FIG. 2 is a back perspective view of an embodiment of the disclosure.
Figure 3:
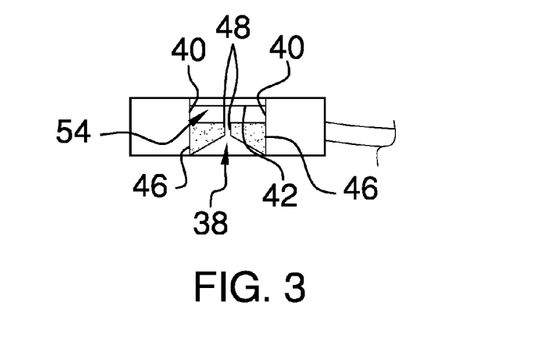
FIG. 3 is a top view of an embodiment of the disclosure.
Figure 4:
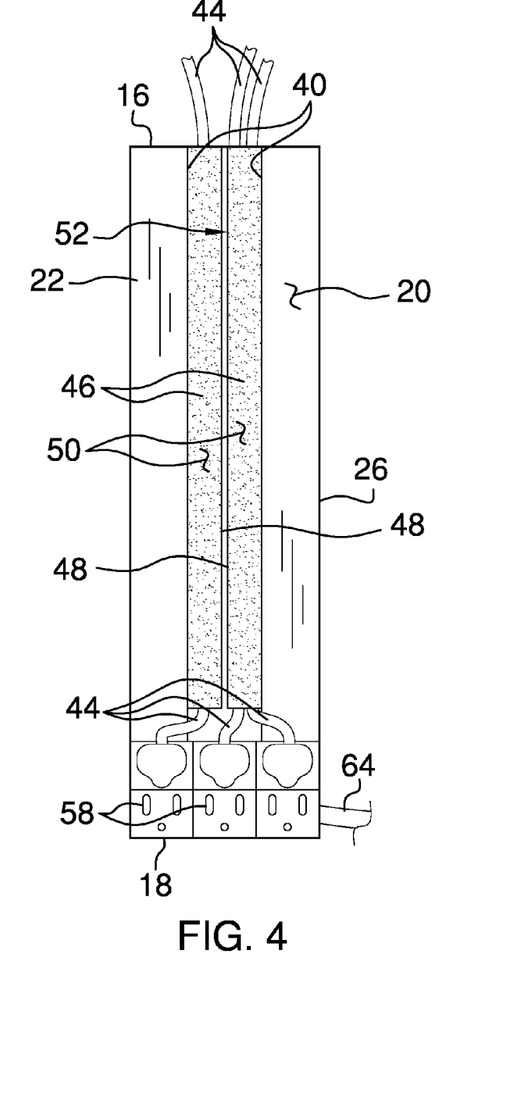
FIG. 4 is a front view of an embodiment of the disclosure.
Figure 5:
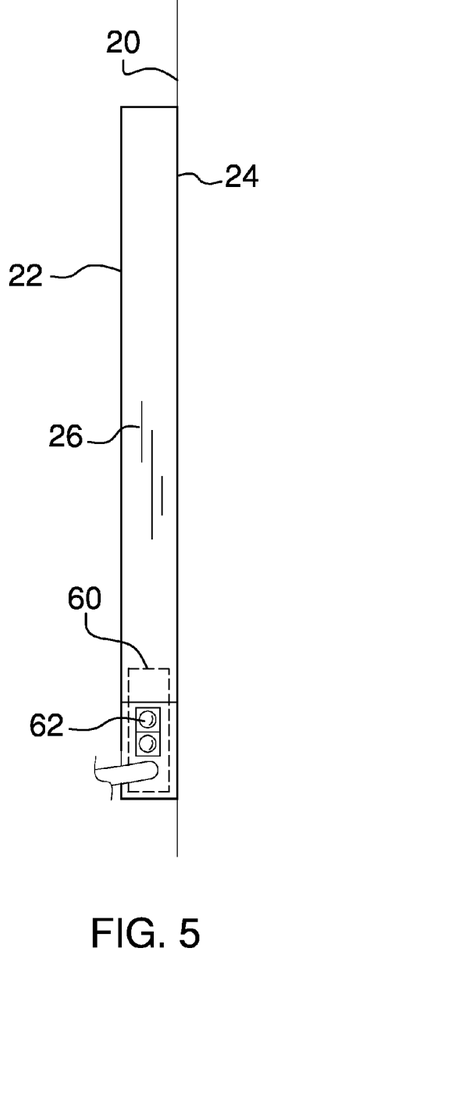
FIG. 5 is a left side view of an embodiment of the disclosure.
Figure 6:
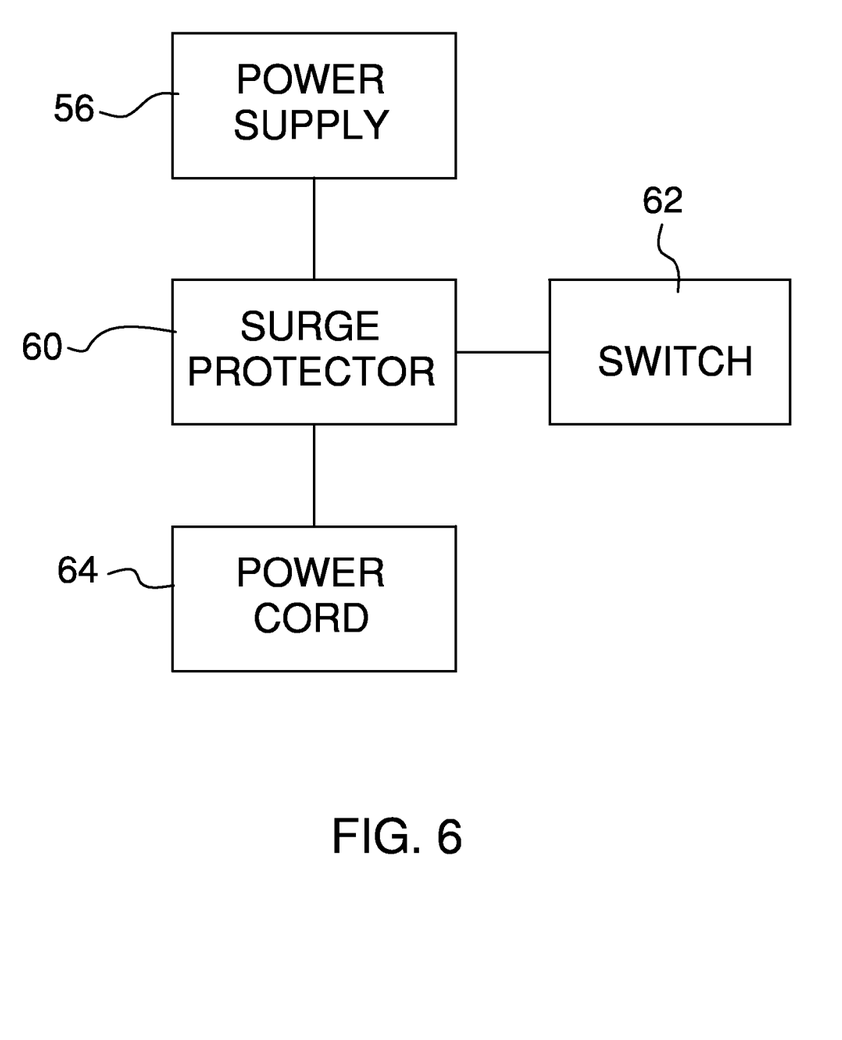
FIG. 6 is a schematic view of an embodiment of the disclosure.

With reference now to the drawings, and in particular to FIGS. 1 through 6 thereof, a new organizing device embodying the principles and concepts of an embodiment of the disclosure and generally designated by the reference numeral 10 will be described.

As best illustrated in FIGS. 1 through 6, the cord organizing assembly 10 generally comprises a housing 12 that may be coupled to a support surface 14 and the support surface 14 may be a wall or the like. The housing 12 has a first end 16, a second end 18 and a peripheral surface 20 extending between the first end 16 and the second end 18. The peripheral surface 20 has a front side 22, a back side 24 and a first lateral side 26 and the back side 24 may be abutted against the support surface 20.

The back side 24 has a pair of openings 30 extending therethrough. Each of the openings 30 is spaced apart from each other and each of the openings 30 is positioned adjacent to the first end 16. Each of the openings 30 has a narrow portion 32 extending upwardly from a wide portion 34. The wide portion 34 of each of the openings 30 may insertably receive a fastener in the support surface 20. The housing 12 is lowered on the fasteners so the fasteners are positioned in the narrow portion 32 of the openings 30 thereby retaining the housing 12 on the support surface 14. The fasteners may comprise a nail or the like.

The front side 22 of the housing 12 has a well 38 extending toward the back side 24. The well 38 has a pair of lateral bounding surfaces 40 and a rear bounding surface 42 and each of the lateral bounding surfaces 40 is spaced apart from each other. The well 38 extends from the first end 16 to a point that is closer to the second end 18 than the first end 16. Thus, the well 38 may have a plurality of cords 44 positioned within the well 38. The well 38 is centrally positioned on the front side 22 and the cords 44 may be cords from electronic devices or the like.

A pair of retainers 46 is provided and each of the retainers 46 is coupled the housing 12. Each of the retainers 46 is positioned on an associated one of the lateral bounding surfaces 40 of the well 38 and each of the retainers 46 is substantially coextensive with the associated lateral bounding surface 40. Each of the retainers 46 has a distal end 48 with respect to the associated lateral bounding surface 40 and each of the retainers 46 has a front surface 50. The distal end 48 of each of the retainers 46 is directed toward each other and is spaced apart to define a cord space 52 between each of the retainers 46. Thus, the cord space 52 may have each of the cords 44 urged through the cord space 52.

The front surface 50 of each of the retainers 46 tapers rearwardly between the associated lateral bounding surface 40 and a respective distal end 48. Thus, the front surface 50 of each of the retainers 46 directs the cords 44 toward the cord space 52. Each of the retainers 46 is spaced from the rear bounding surface 42 of the well 38 to define a storage space 54 between the retainers 46 and the rear bounding surface 42. Thus, the storage space 54 removably contains each of the cords 44 thereby facilitating the cords 44 to be organized with respect to the housing 12. Each of the retainers 46 may be comprised of a resiliently compressible material such as foam rubber.

A power supply 56 is coupled to the housing 12. The power supply 56 may have each of the cords 44 electrically coupled to the power supply 56 thereby facilitating the power supply 56 to provide electrical power to each of the cords 44. The power supply 56 comprises a plurality of power sockets 58. Each of the power sockets 58 is positioned on the front side 22 of the housing 12 wherein each of the power sockets 58 may have one of the cords 44 electrically coupled thereto. Each of the power sockets 58 may be positioned between the well 38 and the second end 18 of the housing 12 and each of the power sockets 58 may comprise an electrical outlet.

A surge protector 60 is coupled to the housing 12 and the surge protector 60 is electrically coupled to each of the power sockets 58. Thus, the surge protector 60 prevents each of the cords 44 from being exposed to an electrical surge. The surge protector 60 includes a switch 62 and the switch 62 is electrically coupled to the surge protector 60. The switch 62 may be manipulated between an on position and an off position and the switch may be positioned on the first lateral side 26 of the housing 12. The surge protector 62 may be an electrical surge protector of any conventional design.

A power cord 64 is coupled to the housing 12 and the power cord 64 extends outwardly from the first lateral side 26 of the housing 12. The power cord 64 is electrically coupled to the surge protector 60 and the power cord 64 has a distal end 66 with respect to the housing 12. The distal end 66 has a plug 68 that is electrically coupled thereto wherein the plug 68 may be electrically coupled to a power source 70. The power source 70 may be an electrical outlet or the like.

In use, the housing 12 is coupled to the support surface 14 and each of the cords 44 is urged through the cord space 52 to be stored within the storage space 54. Each of the cords 44 is plugged into one of the power sockets 58. The power cord 64 is electrically coupled to the power source 70 and the switch 62 is manipulated into the on position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cord organizing assembly configured to provide electrical power to a plurality of cords while keeping the cords organized, said assembly comprising:
   a housing configured to be coupled to a support surface, said housing having a well therein wherein said well is configured to have a plurality of cords positioned within said well, said housing having a front side, a first end, and a second end;
   a pair of retainers, each of said retainers being coupled to said housing, each of said retainers being positioned within said well wherein each of said retainers is configured to retain the cords within said well; and
   a power supply being coupled to said housing wherein said power supply is configured to have each of the cords being electrically coupled to said power supply thereby facilitating said power supply to provide electrical power to each of the cords, said power supply comprises a plurality of power sockets, each of said power sockets being positioned on said front side of said housing wherein each of said power sockets is configured to have one of the cords electrically coupled thereto, each of said power sockets being positioned between said well and said second end of said housing.

2. The assembly according to claim 1, wherein said housing has a peripheral surface extending between said first end and said second end, said peripheral surface having said front side, a back side and a first lateral side, said back side being configured to be abutted against a support surface, said front side of said housing having said well extending therein toward said back side.

3. The assembly according to claim 2, wherein said well has a pair of lateral bounding surfaces and a rear bounding surface, each of said lateral bounding surfaces being spaced apart from each other, said well extending from said first end to a point being closer to said second end than said first end, said well being centrally positioned on said front side.

4. The assembly according to claim 1, further comprising a surge protector being coupled to said housing, said surge protector being electrically coupled to each of said power sockets wherein said surge protector is configured to prevent each of the cords from being exposed to an electrical surge.

5. The assembly according to claim 4, further comprising:
   said housing having a first lateral side; and
   a power cord being coupled to said housing, said power cord extending outwardly from said first lateral side of said housing, said power cord being electrically coupled to said surge protector, said power cord having a distal end with respect to said housing, said distal end having a plug being electrically coupled thereto wherein said plug is configured to be electrically coupled to a power source.

6. A cord organizing assembly configured to provide electrical power to a plurality of cords while keeping the cords organized, said assembly comprising:
   a housing configured to be coupled to a support surface, said housing having a well therein wherein said well is configured to have a plurality of cords positioned within said well, wherein said housing has a peripheral surface extending between said first end and said second end, said peripheral surface having said front side, a back side and a first lateral side, said back side being configured to be abutted against a support surface, said front side of said housing having said well extending therein toward said back side;
   said well having a pair of lateral bounding surfaces and a rear bounding surface, each of said lateral bounding surfaces being spaced apart from each other, said well extending from said first end to a point being closer to said second end than said first end, said well being centrally positioned on said front side;
   a pair of retainers, each of said retainers being coupled to said housing, each of said retainers being positioned within said well wherein each of said retainers is configured to retain the cords within said well;
   a power supply being coupled to said housing wherein said power supply is configured to have each of the cords being electrically coupled to said power supply thereby facilitating said power supply to provide electrical power to each of the cords; and
   each of said retainers is positioned on an associated one of said lateral bounding surfaces of said well, each of said retainers being substantially coextensive with said associated lateral bounding surface, each of said retainers having a distal end with respect to said associated lateral bounding surface, each of said retainers having a front surface, said distal end of each of said retainers being directed toward each other and being spaced apart to define a cord space between each of said retainers wherein said cord space is configured to have each of the cords urged through said cord space.

7. The assembly according to claim 6, wherein said front surface of each of said retainers tapers rearwardly between said associated lateral bounding surface and a respective distal end wherein said front surface of each of said retainers is configured to direct the cords toward said cord space.

8. The assembly according to claim 7, wherein each of said retainers is spaced from said rear bounding surface of said well to define a storage space between said retainers and said rear bounding surface wherein said storage space is configured to removably contain each of the cords thereby facilitating the cords to be organized with respect to said housing.

9. A cord organizing assembly configured to provide electrical power to a plurality of power cords while keeping the power cords organized, said assembly comprising:

a housing configured to be coupled to a support surface, said housing having a first end, a second end and a peripheral surface extending between said first end and said second end, said peripheral surface having a front side, a back side and a first lateral side, said back side being configured to be abutted against the support surface, said front side having a well extending toward said back side, said well having a pair of lateral bounding surfaces and a rear bounding surface, each of said lateral bounding surfaces being spaced apart from each other, said well extending from said first end to a point being closer to said second end than said first end wherein said well is configured to have a plurality of cords positioned within said well, said well being centrally positioned on said front side;

a pair of retainers, each of said retainers being coupled to said housing, each of said retainers being positioned on an associated one of said lateral bounding surfaces of said well, each of said retainers being substantially coextensive with said associated lateral bounding surface, each of said retainers having a distal end with respect to said associated lateral bounding surface, each of said retainers having a front surface, said distal end of each of said retainers being directed toward each other and being spaced apart to define a cord space between each of said retainers wherein said cord space is configured to have each of the cords urged through said cord space, said front surface of each of said retainers tapering rearwardly between said associated lateral bounding surface and a respective distal end wherein said front surface of each of said retainers is configured to direct the cords toward said cord space, each of said retainers being spaced from said rear bounding surface of said well to define a storage space between said retainers and said rear bounding surface wherein said storage space is configured to removably contain each of the cords thereby facilitating the cords to be organized with respect to said housing; and a power supply being coupled to said housing wherein said power supply is configured to have each of the cords being electrically coupled to said power supply thereby facilitating said power supply to provide electrical power to each of the cords, said power supply comprising:

a plurality of power sockets, each of said power sockets being positioned on said front side of said housing wherein each of said power sockets is configured to have one of the cords electrically coupled thereto, each of said power sockets being positioned between said well and said second end of said housing, a surge protector being coupled to said housing, said surge protector being electrically coupled to each of said power sockets wherein said surge protector is configured to prevent each of the cords from being exposed to an electrical surge, and a power cord being coupled to said housing, said power cord extending outwardly from said first lateral side of said housing, said power cord being electrically coupled to said surge protector, said power cord having a distal end with respect to said housing, said distal end having a plug being electrically coupled thereto wherein said plug is configured to be electrically coupled to a power source.

* * * * *